(12) United States Patent
Carney et al.

(10) Patent No.: US 9,773,428 B2
(45) Date of Patent: Sep. 26, 2017

(54) COMPUTERIZED SYSTEM AND METHOD FOR TEACHING, LEARNING, AND ASSESSING STEP BY STEP SOLUTIONS TO STEM PROBLEMS

(71) Applicant: Fluidity Software, Inc., Somerville, MA (US)

(72) Inventors: Donald P. Carney, Somerville, MA (US); Andrew Forsberg, Leominster, MA (US)

(73) Assignee: Fluidity Software, Inc., Somerville, MA (US)

( * ) Notice: Subject to any disclaimer, the term of this patent is extended or adjusted under 35 U.S.C. 154(b) by 296 days.

(21) Appl. No.: 14/735,344

(22) Filed: Jun. 10, 2015

(65) Prior Publication Data
US 2015/0269868 A1    Sep. 24, 2015

Related U.S. Application Data

(63) Continuation-in-part of application No. 14/101,862, filed on Dec. 10, 2013, now Pat. No. 9,576,495.
(Continued)

(51) Int. Cl.
*G09B 19/02* (2006.01)
*G09B 7/02* (2006.01)
(Continued)

(52) U.S. Cl.
CPC ............. *G09B 19/025* (2013.01); *G09B 5/12* (2013.01); *G09B 7/02* (2013.01); *G09B 7/06* (2013.01)

(58) Field of Classification Search
CPC .......... G09B 19/025; G09B 7/02; G09B 7/06; G09B 5/12; G09B 5/14; G09B 5/08; G09B 5/125; G09B 7/07; G06F 3/04883; G06F 15/0225; G06K 9/00402; G06K 9/00442; G06K 9/222
See application file for complete search history.

(56) References Cited

U.S. PATENT DOCUMENTS 5,176,520 A    1/1993  Hamilton ...................... 434/350
5,596,698 A *  1/1997  Morgan ............... G06F 3/04883
                                                       382/186

(Continued)

*Primary Examiner* — Nathan Hillery
(74) *Attorney, Agent, or Firm* — Bodner & O'Rourke, LLP; Gerald T. Bodner; Christian P. Bodner

(57) ABSTRACT

An online system provides for the teaching and learning of step by step solutions to STEM problems. The system comprises at least one tablet computer linked to at least one computer readable storage medium by a communication network. The computer includes an input device and a touch sensitive screen for receiving and displaying handwritten input. A system user inputs the computer with the steps of a step by step solution to a STEM problem by handwriting math expressions and sketches on the touch sensitive screen. The system evaluates and automatically color codes each step in accordance with a color coding protocol stored in the computer readable storage medium as each step is entered into the system. The color coding provides visual feedback which identifies correct steps, erroneous steps, and intermediate steps in the solution. Teachers use the feedback when teaching STEM solutions and students use the feedback when they are practicing and assessing their own solutions.

20 Claims, 12 Drawing Sheets

Related U.S. Application Data

(60) Provisional application No. 61/736,001, filed on Dec. 11, 2012.

(51) Int. Cl.
*G09B 5/12* (2006.01)
*G09B 7/06* (2006.01)

(56) References Cited

U.S. PATENT DOCUMENTS

| | | | |
|---|---|---|---|
| 6,760,748 B1 | 7/2004 | Hakim | 709/204 |
| 7,213,211 B1 | 5/2007 | Sanders et al. | 715/753 |
| 7,466,958 B2 | 12/2008 | Dunk et al. | 434/362 |
| 7,752,148 B2 | 7/2010 | Yu et al. | 706/12 |
| 2004/0157203 A1* | 8/2004 | Dunk | G09B 7/02 434/350 |
| 2004/0267607 A1 | 12/2004 | Maddux | 705/11 |
| 2006/0024649 A1 | 2/2006 | Vernon | 434/201 |
| 2009/0018979 A1 | 1/2009 | Yu et al. | 706/12 |
| 2010/0225602 A1 | 9/2010 | Fujimura | 345/173 |
| 2011/0159465 A1 | 6/2011 | Gutridge | 434/154 |
| 2011/0234516 A1 | 9/2011 | Nakajima et al. | 345/173 |
| 2011/0244434 A1 | 10/2011 | Livne et al. | 434/188 |
| 2013/0164726 A1 | 6/2013 | Michalowski et al. | 434/362 |
| 2013/0244218 A1 | 9/2013 | Cook et al. | 434/350 |
| 2015/0199598 A1* | 7/2015 | Iams | G06K 9/00442 434/358 |
| 2015/0269859 A1 | 9/2015 | Michalowski et al. | 434/362 |

* cited by examiner

| Line No. | Figure | GUI Display | Color Code |
|---|---|---|---|
| 1 | 4A | First | Green |
| 2 | 4B | Second | Yellow |
| 3 | 4C | Third | Green |
| 4 | 4D | Fourth | Blue |
| 5 | 4E | Fifth | Green |
| 6 | 4F | Sixth | Green |

FIG. 4G

COMPUTERIZED SYSTEM AND METHOD FOR TEACHING, LEARNING, AND ASSESSING STEP BY STEP SOLUTIONS TO STEM PROBLEMS

CROSS-REFERENCE TO RELATED APPLICATIONS

This application is a continuation-in-part of U.S. application Ser. No. 14/101,862, filed on Dec. 10, 2013, and entitled "COMPUTERIZED SYSTEM AND METHOD FOR TEACHING, LEARNING, AND ASSESSING THE KNOWLEDGE OF STEM PRINCIPLES", the disclosure of which is incorporated herein by reference and on which priority is hereby claimed.

BACKGROUND OF THE INVENTION

Field of the Invention

This invention relates to teaching tools for the teaching, learning, and assessing of student understanding of Science, Technology, Engineering and Mathematics (STEM) subjects, and, more particularly, relates to tools which utilize a touch sensitive computer screen to teach, learn, and assess student understanding of STEM subjects.

Description of Related Art

In the field of education, devices or systems of cooperating devices which are used to enhance teaching and learning are commonly referred to as either teaching tools or teaching interventions. Furthermore, the evaluations of certain aspects of an educational process, such as subject matter questions or achievement tests administered to students, are commonly referred to as assessments.

Currently, various tools or interventions, as they are called in the art, are used to teach and motivate the learning of mathematical and physical concepts. These tools include chalkboard, whiteboard, graphing calculator, personal computers, pen-enabled tablet computers, Interactive Whiteboards (IWB), computational mathematics engines, concept visualization software tools, and the experimental laboratory. Whereas each of these tools individually engages students in its own way, a physical disconnect exists between them. For example, a graphing calculator is separate and distinct from a chalkboard and each of these tools requires different expertise to use. When a teacher switches from tool to tool, the change interrupts the flow of teaching and distracts students.

Recently, mobile tablets with touch sensitive screens (for example, iPad™ devices, Android™ devices, and similar devices), because of their low cost, are becoming ubiquitous in classroom environments. Teachers and students are using the didactic features of tablets to teach and learn STEM subjects wherein notation is an important requirement. For example, entering a math notation, such as $$x = \frac{-b \pm \sqrt{b^2 - 4ac}}{2a},$$

is more difficult and time consuming when entering these types of expressions into a computer using a keyboard and mouse compared to a user inputting the touch sensitive screen of a tablet with a stylus or fingertip, as if using paper and pencil.

Teachers of STEM subjects recognize the need to visually reinforce students' understanding of abstract concepts as these concepts are being presented in a classroom environment. Furthermore, since most STEM problems are solved with step by step solutions, it is important that students understand and visualize how step by step solutions are created. Presently, most teaching systems and methods which include a visualization component require teachers to switch tools during class—one tool to present lesson content and another to provide visual reinforcement. For example, a teacher may use a chalkboard or a whiteboard to present a step by step solution and a graphing calculator to visually reinforce it.

There is a need in the art for a single multifunctional tool which can be used by a teacher to not only present the steps of a step by step solution but also provide simultaneous reinforcement thereof using a system and a method which does not interrupt the flow of teaching. A single tool is needed which is easy to learn and easy to use and which does not require hours of training to learn a new programming language. Using the teaching tool of the instant invention is as simple as working with pencil-and-paper. It evaluates the correctness of each step of a step by step solution and automatically color codes each step to provide a graphical overview of a complete solution, all without interrupting the flow of teaching.

What follows are descriptions of products which are known in the industry and which are currently available as computerized teaching interventions for the teaching of STEM subjects:

Graphing calculators have been widely adopted in classrooms because of their computational power, but they require significant training before users (both students and teachers) become experts at finding the complicated sequence of button pushes needed to solve and graph problems.

Microsoft Math™ embodies graphing calculator software targeted toward use in math education. Even though its interface is tablet PC enabled and incorporates rudimentary entry of handwritten math, it is not a fully pen-centric application. The application requires keyboard entry for effective use. Also, the Microsoft Math™ software product does not offer ease of entry of mathematical notation, interface commands and free-form drawings.

XThink's MathJournal™ is a Tablet PC application for the type of mathematical problem solving that is performed by engineers and scientists rather than students. It focuses on functionality rather than on an uninterrupted teaching experience.

Interactive Physics™ and The Geometer's SketchPad™ require users to learn an unfamiliar WIMP-based (Windows, Icons, Menu's, Pointers) visual language. This unfamiliar, as compared to pencil and paper, style of interaction makes these programs inaccessible to many casual users, and presents significant usage barriers for classroom and problem solving settings.

Systems such as Mathematica™, Maple™, Matlab™, and MathCad™ are focused primarily on entering mathematics for computation, symbolic mathematics, and illustration. These tools require complex scripting languages for mathematical entry. Although these languages use mathematical notation, they are one dimensional and require unconventional keyboard-based entry which is much less intuitive than using 2D handwritten mathematics. None of these systems let the user create diagrams on the screen of a computer in a natural pencil-and-paper style.

FluidMath™ provides a system for the teaching and learning of STEM subjects through the use of handwritten input into pen-enabled computers. FluidMath™ enables the user of a tablet PC to create, solve, and explore STEM principles all in his or her own handwriting as if working with pencil and paper. However, FluidMath™ does not teach a system which color codes each step of a step by step solution to a STEM problem handwritten on the touch sensitive screen of a tablet PC.

There are also a number of U.S. patents which disclose teaching systems and methods. For example, U.S. Pat. No. 5,176,520 which issued to Eric Hamilton on Jan. 5, 1993, discloses a computer-assisted instructional information delivery system having at least two stations—one station for an instructor and one or more stations for students. An interactive monitor is positioned in each station. Each interactive monitor displays instructional information in visual form as inputted by a stylus or light pen on the interactive monitor. A network communication system operated by a central processing unit and corresponding software communicates the instructional information from the stylus as inputted on one of the interactive monitors and selectively displays the instructional information simultaneously and concurrently onto any or all of the interactive monitors of the stations. Hamilton does not disclose a system which automatically evaluates the correctness of the instructional information input into the interactive monitors.

U.S. Pat. No. 6,760,748, which issued to Omar Hakim on Jul. 6, 2004, discloses an interactive electronic instructional system as a teaching interface between a teacher and students where data is transmitted from the teacher's terminal to the students' terminals. The data is received at the student terminals and is separated into execution data and instructional data. The student terminals are grouped into teams allowing student teams to interact with a group decision. This encourages team participation by shy or otherwise reluctant students. Team answer data is transmitted from one of the student terminals in the team to the teacher's terminal. The teacher monitors team answer data to infer class progress towards a goal. The teacher may modify the instructional data based on the progress. Hakim does not disclose a system which automatically produces feedback regarding the correctness of each step of a step by step solution to a STEM problem.

U.S. Patent Application Publication No. 2006/0024649 issued to David H. Vernon on Feb. 6, 2006 discloses a handheld device, typical of a graphing calculator, for aiding students in solving mathematical problems. Rather than solving the problem for the student it provides a graphical environment where students can step through the solution process. The problems and their solutions are entered into the devices by pushing buttons on the face of the device. The invention enforces the hard and fast rules of arithmetic and mathematics as the student performs steps in solving a problem and notifies the student via a text message shown on a screen on the face of the device when those rules are violated. Vernon does not disclose a system which understands whether handwritten math notation input is correct.

U.S. Pat. No. 7,213,211, which issued to Sanders et al. on May 1, 2007, discloses a system for knowledge transfer in a group setting and comprises a plurality of participant work areas and a moderator work area. Each of the plurality of participant work areas has at least one corresponding participant input-device, and each of the participant input-devices is adapted to define participant images that are then included on the corresponding participant work area. The moderator work area comprises at least one moderator input-device. The at least one moderator input-device is adapted to define moderator images that are then included on the moderator work area and to select moderator images that are then simultaneously included on each of the plurality of participant work areas. The moderator input-device is further adapted to select participant images from any of the plurality of participant work areas that are then included on the moderator work area. Sanders does not teach work areas which receive handwritten input drawn on the screen of a tablet PC.

U.S. Pat. No. 7,466,958, which issued to Dunk et al. on Dec. 16, 2008, discloses an on-line teaching and learning system with rapid change-by-change or real-time reinforcement of student responses to math questions, including monitoring by the teacher of the actual responses as well as their correctness. Equations or expressions are entered by selecting one or more symbols from a menu, selecting one or more symbols using buttons in the application, using one or more hotkeys, and/or entering information in a character bases syntax. Dunk et al. does not disclose a system which accepts, recognizes and evaluates handwritten math notation input.

U.S. Pat. No. 7,752,148 which issued to Yu et al. on Jul. 6, 2010 discloses a problem checker architecture that monitors user progress during a problem-solving process and assists the user through the process (e.g., when requested) using common human methods of solving the problem. Assistance can be in the form of detecting errors during the process, and providing context-sensitive help information when the user gets stuck or makes a mistake. The problem checker comprises an input component for receiving a math problem to be worked via a solving process and a problem checker for monitoring the process and generating context-sensitive information as part of the solving process wherein the context-sensitive information includes at least one of hint information, correction information, or a solution generated in response to a user action during the solving process. Yu does not teach a means to color code each step of a step by step solution.

The above-noted products and U.S. patents do not disclose systems which enable teachers to teach solutions to STEM problems by combining the use of pen-enabled computers with spontaneous handwritten input of math notation. The prior art does not teach a means for color coding the steps of a step by step solution to STEM problems as each step is being written on the screen of a pen-enabled computer and it does not teach a means for providing instant feedback regarding the correctness of each step. Moreover, there is no prior art, of which we are aware, that discloses a system and a method enabling teachers to create a fully color coded step by step solution thereby visually defining all of the steps of the solution. There is a need in the art for an intervention wherein a teacher can provide instant visual feedback to his/her students regarding the correctness of each step of a solution to a problem as they are being presented in class. There is also a need in the art for a system which enables teachers to generate a fully color coded step by step solution to STEM problems in order to help students gain a deeper understanding of the process used to derive the solution. Finally, there is a need in the art for an intervention wherein students, when exploring problems on their own, are provided instant visual feedback as to the correctness of each step of their solutions and are also provided a color coded linkage between all the steps of their complete solution.

OBJECTS AND SUMMARY OF THE INVENTION

It is an object of the present invention to provide a computerized teaching system and method for the teaching, learning, and assessing of a student's understanding of STEM subjects.

It is another object of the present invention to provide a totally pen-centric system using tablet computers.

It is still another object of the present invention to provide means included in the system for teachers to teach STEM principles using handwritten math input on the screen of a tablet computer.

It is still another object of the present invention to provide a tool for use on a tablet computer for presenting and teaching step by step solutions to STEM problems.

It is still another object of the present invention to provide a system and method which automatically color codes each step of a step by step solution to a STEM problem as each step is being written on a tablet thereby providing visual feedback as to the correctness of each step.

It is still another object of the present invention to provide a system and method which automatically color codes all of the steps of a step by step solution in order to help a student visualize and understand the development of a complete solution.

It is still another object of the present invention to provide a system and method which enables students to answer practice questions using handwritten math symbols and math expressions.

It is still another object of the present invention to provide a system and method that can be used by students to solve practice questions using handwritten math notation wherein the system evaluates the answers on a step by step basis, thereby providing the student with a rapid evaluation of each step of the solution.

It is yet a further object of the present invention to provide a system and method that can be used by students to solve practice questions using handwritten math notation wherein the system color codes all of the steps of the solution providing the student with a visual linkage of all of the algebraic equivalent steps in the step by step solution It is yet a further object of the present invention to provide a teaching system and method for the teaching and learning of STEM subjects which overcome the inherent disadvantages of known teaching systems and methods.

In accordance with one form of the present invention, a computerized teaching system provides a teaching tool for presenting and teaching step by step solutions to STEM (science, technology, engineering and mathematics) questions. The system includes a communications network, at least one teacher computer operable by a respective teacher, at least one student computer operable by a respective student and at least one computer-readable storage medium.

Each of the at least one teacher computer and the at least one student computer includes an input device and a touch sensitive screen for receiving handwritten input via the input device. The at least one student computer is operably connected to the at least one teacher computer via the communications network.

The at least one teacher computer and the at least one student computer are operatively linked to the at least one computer-readable storage medium containing program instructions for implementing an application of the teaching system comprising one or more program instructions for performing the steps of:

(a) receiving at least one question description being handwritten in algebraic math notation by the teacher on the touch sensitive screen of the at least one teacher computer and being displayed thereon;

(b) highlighting the math notation of the at least one question description defined in step (a) using a first highlighting color to provide a highlighted math notation of the at least one question description;

(c) displaying the highlighted math notation of the at least one question description of step (b) on the screen of the at least one student computer;

(d) receiving at least one step of a step by step solution to the at least one question description, the at least one step being handwritten by the teacher in algebraic math notation on the screen of the at least one teacher computer and being displayed thereon;

(e) highlighting the math notation of the at least one step in step (d) by either using the first highlighting color in step (b) if the math notation of the at least one step of step (d) is the algebraic equivalent of the math notation of the at least one question description of step (b) or using a second highlighting color if the math notation of the at least one step of step (d) is not the algebraic equivalent of the math notation of the at least one question description of step (b) to provide a highlighted math notation of the at least one step, the first highlighting color being different from the second highlighting color;

(f) displaying the highlighted math notation of the at least one step of step (e) in one of the first highlighting color and the second highlighting color on the screen of the at least one student computer; and (g) repeating steps (d), (e) and (f), if necessary, to provide and display on the screen of the at least one student computer a completely color coded step by step solution to the at least one question description.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4G is a table which summarizes the colors used for color coding the steps of a solution to the first example problem.

DETAILED DESCRIPTION OF THE PREFERRED EMBODIMENTS

Teaching STEM subjects requires that students learn and understand abstract concepts. Teachers often use example problems and hand sketches to describe these concepts. Educators have found that it is advantageous to use teaching tools with touch sensitive screens in combination with software applications which optimize the didactic features of these tools thereby enabling teachers to enter standard math notation and hand-sketched diagrams onto the touch sensitive screens while having their input viewed by all students in the class. Furthermore, it is well known in education that students gain a better understanding of solutions to STEM problems if the solutions are presented with visual reinforcement. STEM problem solutions are generally presented by teachers as a series of steps written in mathematical notation.

In today's emerging classroom settings, STEM example problems and their step by step solutions are being presented to students by teachers using any one, or combination of, the following teaching tools:

a) Mobile tablet devices used in a one to one (1:1) environment in which both teachers and students have tablet computers linked together by a communications network enabling the teacher to transmit problems and solutions to problems input on their computer to the students' computers. In this arrangement, students can also explore solutions to problems they elect to download into their student computers.

b) A computer driven display screen located in front of a classroom wherein the teacher inputs the display screen by either handwriting math on the screen of a tablet pc linked to the display screen or by pushing buttons on a graphing calculator linked to the display screen.

c) An Interactive Whiteboard (IWB) input by a teacher writing on the touch sensitive screen of the IWB.

Presently, just about every school in the United States and in most foreign countries has at least one computer driven projector screen and/or at least one IWB. Furthermore, the explosive growth of the use of mobile tablet devices in education has led to school districts in the United States purchasing iPad™ or other tablet devices for all the students and teachers in their district. The use of iPad™ or other tablet devices in education is becoming commonplace and experts in the industry forecast that eventually all teachers and students will bring iPad™ devices to their classes rather than textbooks.

Figure 1:
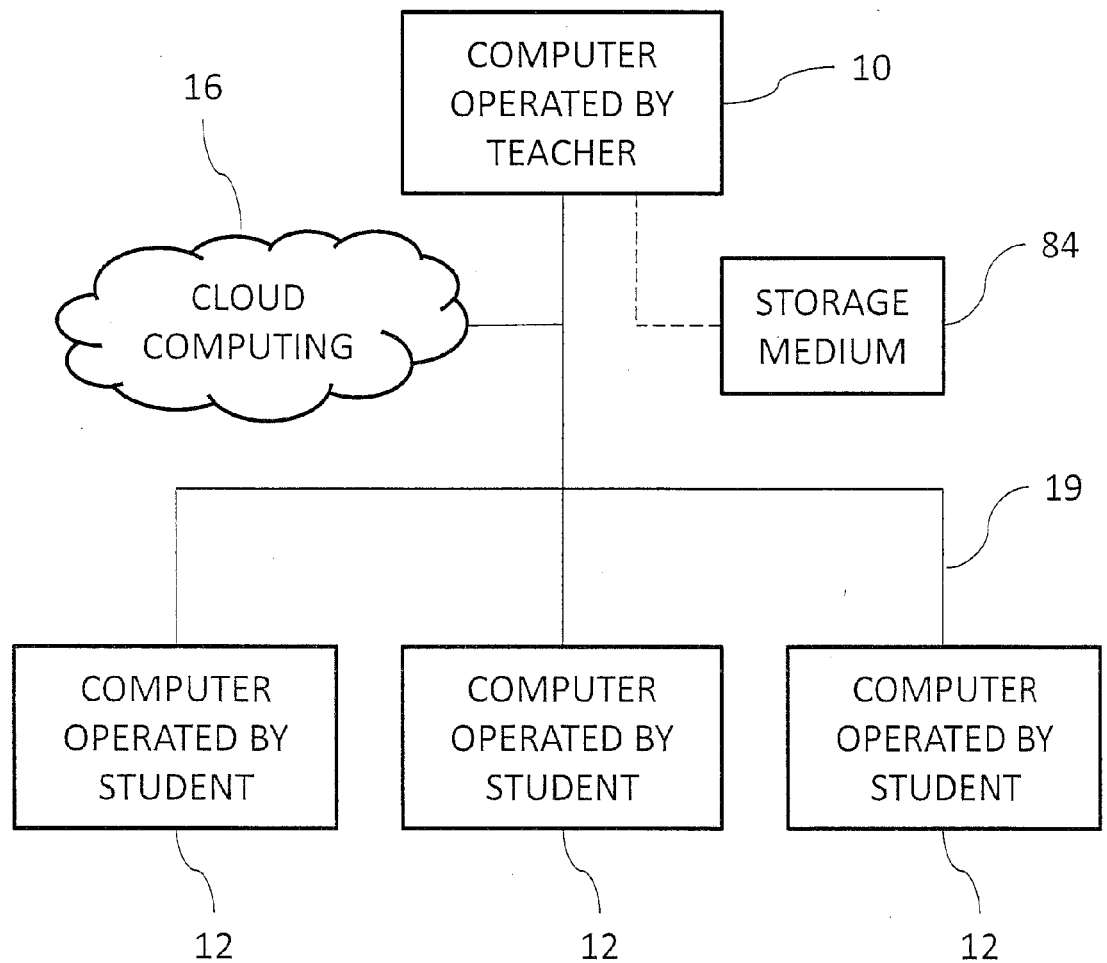
FIG. 1 is a block diagram of a first embodiment of a computerized teaching system formed in accordance with the present invention and having a network of computers.

Turning now to the figures, there is shown in FIG. 1 a first embodiment of a computerized teaching system formed in accordance with the present invention comprising a network of pen-enabled computers used for the teaching and assessing of STEM subjects in a 1:1 environment. At least one pen-enabled computer 10 operated by a teacher is networked with at least one pen-enabled computer 12 operated by at least one student. The computers are connected by a communications network 19 including any one of, but not limited to, a combination of: a local area network (LAN), a wide area network (WAN), or the World Wide Web (WWW) which includes networking to cloud computing 16. The pen-enabled computers 10 and 12 may be located in one classroom or in remote locations for remote tutoring and learning. As is well known in the art, cloud computing 16 refers to the delivery of computing and storage capacity as a service to a heterogeneous community of end users. Its name comes from a cloud-shaped symbol which is often used to designate the complex infrastructure it contains in system diagrams such as FIG. 1. FIG. 1 also shows a non-transitory computer-readable storage medium 84 communicating with the elements in the network.

The logic and software for carrying out the functions of the teacher computer 10 and/or the student computers 12, and to create the various computer engines described below, may be embodied on the non-transitory computer-readable storage medium 84, which is received by, interfaces with, or forms part of, the teacher computer 10 and/or the student computers 12. It should be understood that such computer-readable storage medium 84 includes, and may be realized as, a computer/compact disc (CD), a digital versatile/video disc (DVD), a read only memory (ROM), a programmable read only memory (PROM), an electrically erasable programmable read only memory (EEPROM), a random access memory (RAM) and like devices, each of which is a non-transitory form of a memory.

Figure 2:
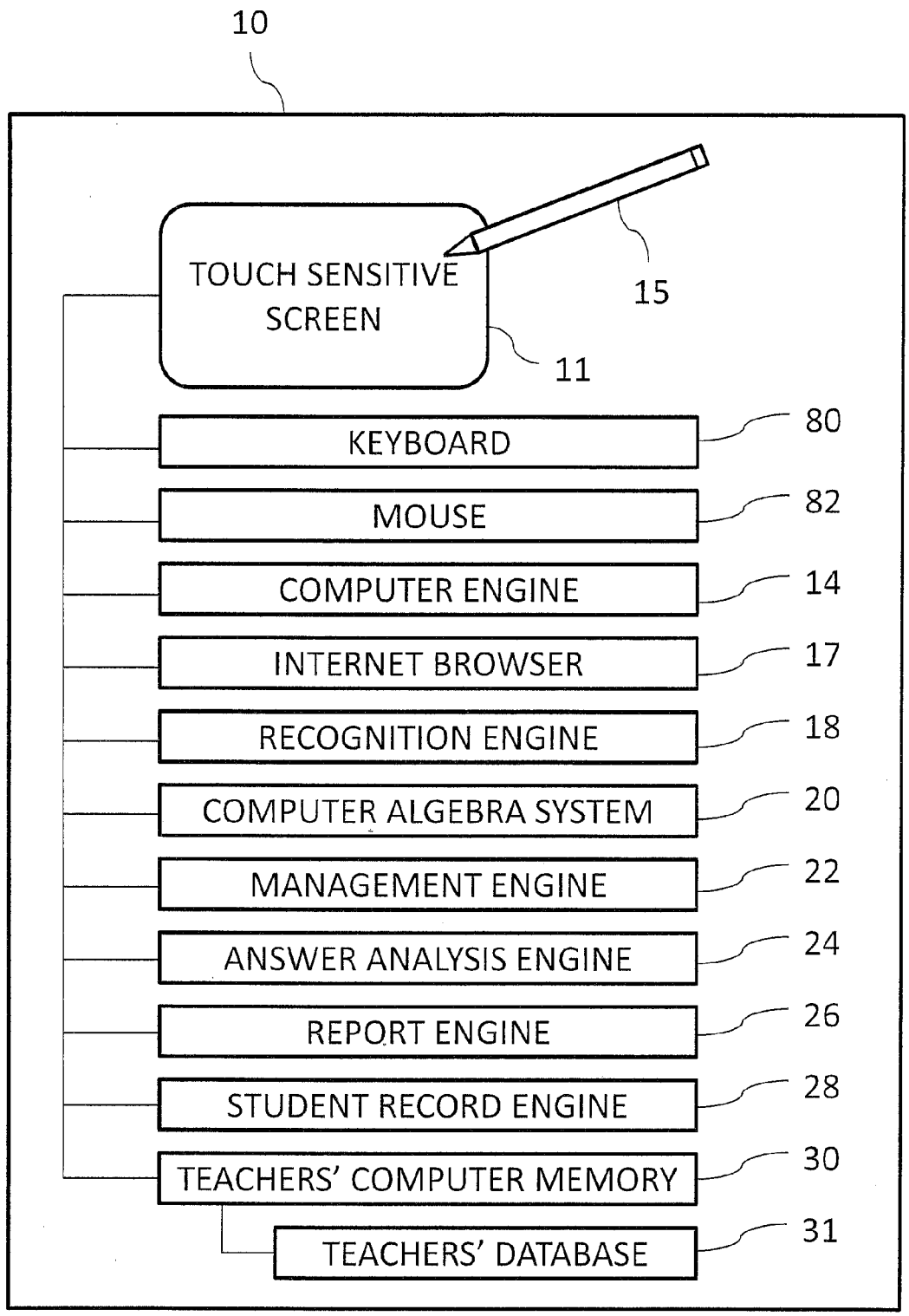
FIG. 2 is a block diagram of the teacher's computer forming part of the system of the present invention.

FIG. 2 is a block diagram of elements included in the pen-enabled computer 10 operated by the teacher. The current explosive growth of tablet PCs with touch sensitive screens has led to a broad range of commercially available tablets along with a variety of operating systems provided in these tablets. Some of these operating systems may not support the functionality required of the system and the method of the present invention. However, most commercially available tablets are supplied with what is well known in the industry as an internet browser 17.

In the present invention, the cloud computer 16 (FIG. 1) has installed therein the software platform necessary to support the functionality of the present invention. The internet browser 17 included in the tablet computers 10 and 12 communicates with the cloud computer 16 to access the platform stored therein, thereby providing the functionality required in the system and method of the present invention. Regardless of what operating system with which any tablet computer is supplied, as long as it has a web browser 17, it will be operable in accordance with the method and system of the present invention and as described herein. Accessing the cloud 16 and the calculations performed therein are entirely transparent to the users.

Pen-enabled computers are common in the industry and are commercially available from Hewlett Packard Company of Palo Alto, Calif., Fujitsu of Tokyo, Japan and Dell, Inc. of Round Rock, Tex., to name a few suppliers. These computers are equipped with a keyboard 80 and a mouse 82, a touch-sensitive graphical user interface (GUI), such as a touch sensitive screen 11, and a stylus 15 to provide input from a user. Computers such as these have a built-in computer engine 14 and a computer memory 30 providing memory capacity for a teacher database 31 for storing pre-determined question descriptions. There are also commercially available tablet pen-enabled computers which do not have an integral keyboard and mouse and rely solely on their touch sensitive screen for user input. These tablets may be purchased from Apple, Inc. of Cupertino, Calif. (e.g., the iPhone™ device or the iPad™ device) and Dell, Inc. of Round Rock, Tex. (e.g., the various Android™ models), two of many suppliers. This type of tablet is less expensive than the computers mentioned above which have an integral keyboard and mouse. Tablet computers 10 and 12 are typically supplied with a web browser 17. Web browsers are built to well-known industry standards, and the functionality of the computers in which they are installed, as will be described below, may be augmented by cloud computing 16 via their internet browsers 17.

As shown in FIG. 2, a software platform comprising a recognition engine 18 and a Computer Algebra System (CAS) 20 is installed in the pen-enabled computer 10 operated by the teacher. Software platforms such as these are commercially available, e.g., FluidMath™ provided by Fluidity Software, Inc., of Somerville, Mass. FluidMath™ enables the user of a pen-enabled computer to create, solve, graph and animate math and science problems and sketches on the screen of their pen-enabled computer. The recognition engine 18 can read handwritten math formulae and sketches drawn on the screen of the computer, understand the formulae, associate the formulae with the sketches, and create solutions, graphs and dynamic animations. The software platform also includes the general-purpose CAS 20. Mathematical computation, graphing and animation are accomplished with the user interfacing with the CAS 20 through handwritten input via the graphical user interface (GUI) screen 11 of the computer. The software of the present invention provides the teacher's tablet computer 10 with the following additional functionality included in the present invention: a network management engine 22, an answer analysis engine 24, a report engine 26 and a student record engine 28. As described below, each of these engines cooperates with the other elements of the pen-enabled computer 10 operated by the teacher. The network management engine 22 enables the teacher to control and administer the computers 10 and 12 in the network 19 to perform the following functions:

a) Store example problems and their solutions in the teacher's computer memory 30.
b) Store assessment quiz questions and their solutions in the teacher's computer memory 30.
c) Select and transmit stored material to the pen-enabled computers 12 operated by the students.
d) Transmit handwritten notation input into the pen-enabled computer 10 operated by the teacher to the pen-enabled computers 12 operated by the students.
e) Enable and disable functionality provided by the pen-enabled computers 12 operated by the students. During assessments, the teacher can transmit over the network an instruction to the student's computer to disable its problem solving capability so that the student solves the assessment, not his/her computer.
f) Store and evaluate the answers transmitted by the students from their computers 12 to the teacher's computer 10.

The answer analysis engine 24 provides the pen-enabled computer 10 operated by the teacher with the functionality to compare answers provided by the students to correct answers stored in the memory 30 of the teacher's computer 10 and/or generated by the CAS 20. The report engine 26 provides the computer 10 operated by the teacher with the functionality to present reports regarding the students' answers to assessments. The student record engine 28 provides the computer 10 operated by the teacher with the functionality to create individual student performance records for each student in the teacher's classes. The results of the assessments can be downloaded to a spreadsheet and stored therein.

Figure 3:
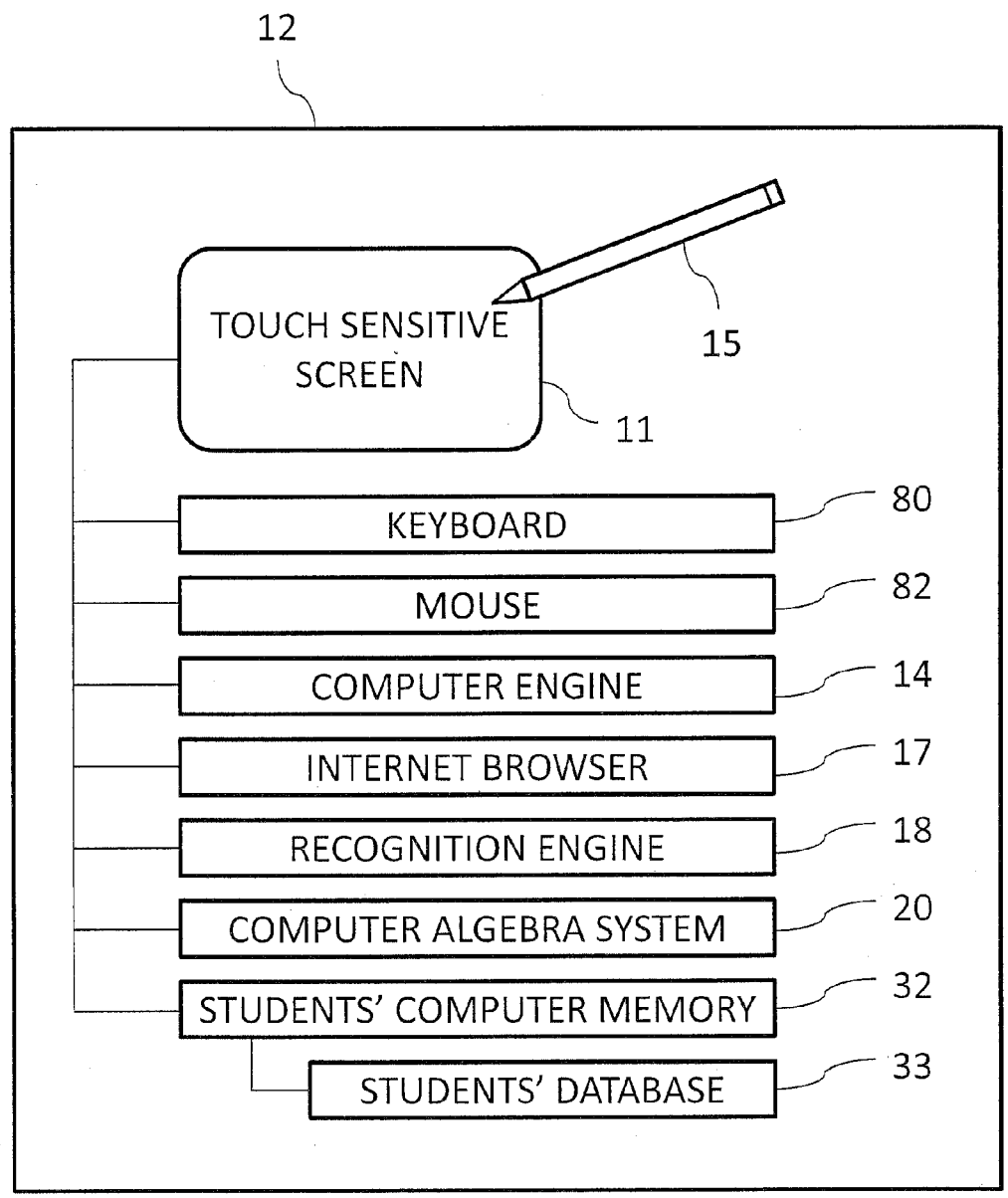
FIG. 3 is a block diagram of the student's computer forming part of the system of the present invention.

FIG. 3 is a block diagram of the elements included in the pen-enabled computer 12 operated by the student. The student computer 12 is a commercially available computer similar to the teacher computer 10 (FIG. 2) and comprises elements similar to the elements in the teacher's computer 10 such as a touch-sensitive screen 11, a built-in computing engine 14, an internet browser 17, a recognition engine 18, and a CAS 20. The student's computer 10 has a student's computer memory 32 for storing information such as pre-defined questions stored in a student database 33 for student assessments. The functionality of the student's computer can be augmented by cloud computing 16. The functionalities of the elements in the student's computer 12 have been described above in the description of the teacher's computer 10 and, for the sake of brevity, are not repeated here.

Although it is disclosed herein that the computer-readable storage medium 84 preferably resides on or is received by the at least one teacher computer 10, it is envisioned to be within the scope of the present invention to have the storage medium 84 residing on or being received by one or more student computers 12, or on the servers or computers which are associated with or perform the function of the cloud computing 16. Furthermore, one or more of the student computers 12 or the cloud computers or remote computers may be structured to include the same features and functionality of the teacher computer 10, as shown in FIG. 2, including a keyboard 80, mouse 82, or a touch sensitive screen 11 and stylus 15, a management engine 22, an answer analysis engine 24, a report engine 26 and a student record engine 28, such that the functions of the teacher computer 10 may be performed by the one or more student computers 12, and any reports may be generated by the one or more student computers 12 and communicated to, and displayed on the display of, the teacher computer 10.

The system of the present invention is used in both a teaching phase and an exercise phase in the teaching and learning of step by step solutions to STEM problems. In the teaching phase, the teacher uses the system and method of the present invention to teach students step by step solutions to STEM problems. In the exercise phase, students solve STEM problems using the system and methods of the present invention.

Figure 4A:
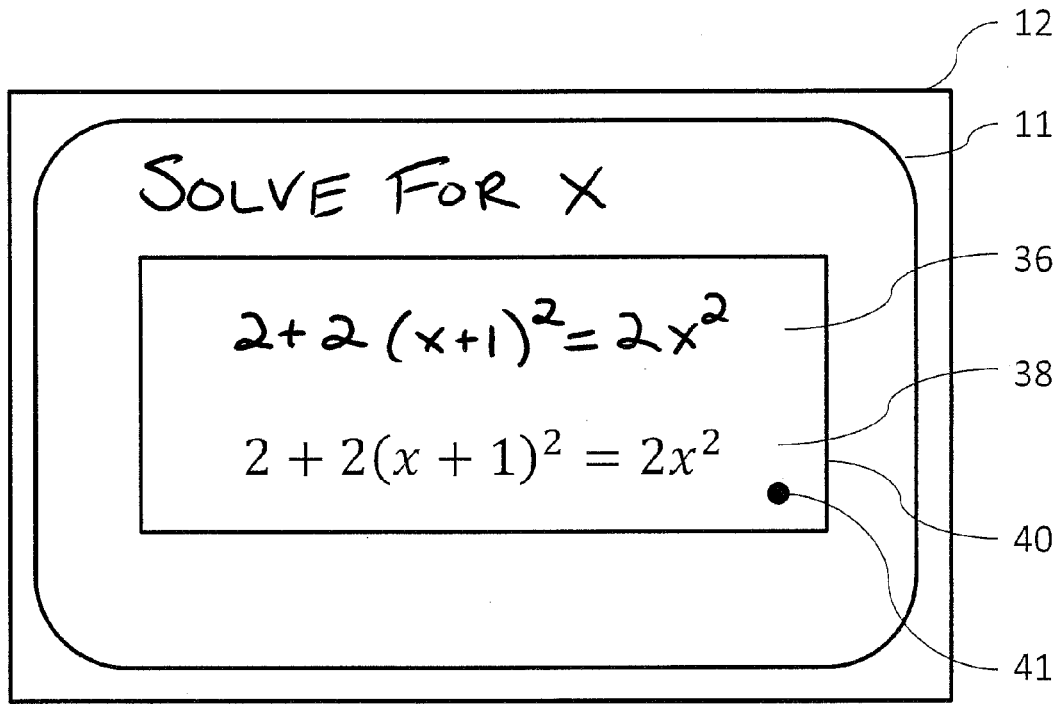
FIG. 4A is a simplified pictorial illustration of a first graphical user interface (GUI) display of a student's computer of the system of the present invention showing an equation comprising a math problem which illustrates a first example problem used in the teaching phase of the method of the present invention.

FIGS. 4A through 4F are simplified pictorial illustrations of the graphical user interface (GUI) displays depicted on the touch sensitive screen 11 of the student's computer 12 in the system of the present invention showing a step by step solution to a first example problem used to describe the teaching phase of the present invention. FIGS. 5A through 5C are simplified illustrations of the GUI displays on the screen 11 of the student's computer 12 showing a step by step solution to a second example problem used to describe the exercise phase. What follows below, by way of these examples, are descriptions of the features of the computerized system and method of the present invention and how they are employed in the classroom for the teaching and learning of STEM principles. It is important to note that the handwriting recognition engine 18 and the CAS 20 enable the teacher to use the teachers' computer 10 to spontaneously create and subsequently solve example problems which can be transmitted to the students' computers 12 for presenting the problems and their solutions to the students. The teacher can also create pre-designed example problems while preparing for a lesson and store them in the teacher's computer 10 for retrieval when teaching a future lesson. Using the instant invention, teachers present the steps of a step by step solution as if they were writing with pencil and paper enabling them to create solutions to a broad range of problems tailored to suit their curricula, teaching methods and teaching techniques. The use of the present invention does not require learning a computer language. Teachers can present not only correct steps but also incorrect steps to encourage student participation in class discussion to determine the correct step.

Unlike the prior art, which typically prompts the steps in a step by step solution, the instant invention enables the teacher to select the next step of the solution as he or she sees fit to meet his or her teaching techniques. Furthermore, teachers can create intermediate steps in the solution to explain algebraic manipulations required to go from one main step in the solution to the next main step to provide any further explanation required in his/her class.

The present invention includes unique color coding functionality which provides means for either a teacher or a student to spontaneously create color coded step by step solutions to a variety of STEM problems on their computers. The color coding protocol interacts with the person inputting the system by employing a series of colors which automatically highlights the algebraic expressions handwritten into the system as described in the example problems presented below. The color coding protocol is enabled by the system of the present invention which determines the algebraic equivalence of math expressions sequentially handwritten on the touch sensitive screen 11 of either the teacher computer 10 or student computer 12.

For example, color coding functionality is provided by the teacher computer 10 as follows:
a) The computer recognition engine 18 recognizes and understands handwritten input.
b) The computer memory 30 stores the handwritten input.
c) The CAS 20 determines the algebraic equivalence of the most recent input step to steps previously stored in the memory 30.
d) The computer readable storage medium 84 directs the sequence of colors used in the color coding protocol.

The colors used for color coding are either preselected by the user of the system or are selected by the program instructions of the computer readable storage medium 84. As shown in FIG. 4A, math expressions are color coded by a highlighting box 40 forming a perimeter around the expression and its color code. In a similar manner, color coding may be enabled on the student computer 12 as described above for the teacher computer 10.

As noted above, the system of the instant invention interacts with the person inputting the steps of the step by step solution. The result of this interaction is a color coded solution which can be used to further a student's understanding of step by step solutions.

After each step is input by the user, the computer readable storage medium 84 assigns a color code to the step. The first color and subsequent colors can either be selected at random by the computer readable storage medium 84 or can be preselected by the user and stored therein. As each step is entered, the CAS 20 determines whether it is the algebraic equivalent of a previous step. If it is, the computer readable storage medium 84 color codes it with the same color as its previous algebraic equivalent. If it is not, the computer readable storage medium 84 automatically codes it with a different color.

The significance of a different color is not the color per se, but rather that the color change highlights a step which is not an algebraic equivalent of a previous step. The person inputting the system knows the intent of each step. For example, the intent could be adding a next step which is an algebraic equivalent of a previous step, adding a new step which is an intermediate step, or either intentionally or unintentionally adding an incorrect step. The color coding protocol alerts the user as to whether each step, as it is being added, is what he/she intended. If the next step is not what was intended, the user can correct the step.

Those skilled in the art recognize that it is advantageous to have a non-transitory programmable storage medium 84 keep track of algebraic equivalent steps because it would be very difficult for the person generating a color coded solution to recall previously entered steps and color code each new step as it is being input in accordance with the protocol.

Furthermore, a digitized version of the handwritten input is generated and presented by the system as verification that the handwritten version was correctly interpreted by the system. Disparities are typically corrected by the user correcting his/her handwritten input such that the system provides the correct digitized version.

Listed below are steps representing the GUI functionality of the instant invention as used by a teacher when developing a step by step solution in the teaching phase of the present invention. It is important to note that a student can also use the functionality during the exercise phase. The order in which the steps are used may vary depending on the step by step solution.

A) The teacher creates a first GUI display by entering a handwritten version of a particular question description in algebraic math notation on the GUI of the teacher computer 10.
B) The GUI displays the handwritten version of the entry along with a digitized version thereof, both versions color coded with a first color.
C) The teacher evaluates the GUI display. If it displays the math expression he/she intended to enter, the teacher proceeds to step E.
D) IF the GUI digitized version is not judged by the teacher to be the intended math expression, the teacher clarifies his/her handwritten version and repeats A and B until the digitized version represents the intended input enabling the teacher to go to step E.
E) To complete the GUI displays of a complete step by step solution, the teacher may be required to add additional steps by entering handwritten versions thereof in a manner similar to that of steps A and B.
F) If an added step is an algebraic equivalent of a previous step, it is color coded with the color code of its previous algebraic equivalent.
G) If an added step is not an algebraic equivalent of a previous step, the system automatically color codes it with a different color.
H) As steps are added, the system keeps track of algebraic equivalents and color codes them accordingly for presentation on the GUI.
I) As each step is being entered, the teacher is aware of whether or not the step is intended to be an algebraic equivalent of a previous step. If the color coding is not consistent with the teacher's expectation, the teacher can correct his/her handwritten input to rectify a discrepancy.

In the pictoral illustrations of the GUIs which are described in the first example, the teacher inputs steps comprising the solution of an example problem on the teacher's computer 10 which is transmitted, including typeface and color coded versions thereof, to the student computer 12 for presentation to the student.

The first example problem disclosed herein is described by simplified pictoral illustrations of the GUI displays residing on the screen 11 of the student computer 12 as shown in FIG. 4A through FIG. 4F. The steps shown in each of these figures were selected to provide a simple explanation of the system and the method of the teaching phase of the instant invention. It is to be understood that in actual teaching and learning settings, step by step solutions to example problems may require more than six GUI displays as shown in this example. The number of steps depends on the complexity of the problem and the teacher's selection of the steps to illustrate the solution. Those skilled in the art recognize that the touch sensitive screen 11 on both the teacher computer 10 and on the student computer 12 can be scrolled by the user to input and/or observe all of the steps of a lengthy step by step solution.

FIG. 4A is a simplified pictoral illustration of a first GUI display residing on the student computer 12 when the system of the instant invention is being used by a teacher to present a step by step solution to the first example problem. In the example, the teacher enters a question description and a step-by-step solution via handwritten input on the touch sensitive screen 11 of the teacher computer 10 and the management engine 22 in the teacher computer 10 transmits the example problem input on the screen 11 of the teacher computer 10 to the screen 11 of the student computer 12 for presentation to the students. The teacher initiates the presentation by writing the question description, solve for x in the math expression $2+2(x+1)^2=2x^2$ (reference No. 36), on the screen 11 of the teacher computer 10 which, as noted above, is transferred to the screen 11 of the student computer 12. The recognition engine 18 in the teacher computer 10 creates a type face version 38 of the handwritten expression 36 to acknowledge having received and understood the math expression and highlights both the handwritten and type face equations in accordance with the color coding protocol. In the first example, the first color green, reference No. 41, is preselected by the teacher to represent algebraic equivalence to the correct answer. The highlighting color for an expression that is added to the step by step solution which is neither an algebraic equivalent of the correct answer nor of a previous expression is preselected as yellow, reference No. 42. A different color can be preselected for each additional color used thereafter. In this example, the color blue, reference No. 43, is preselected as a third color. Those skilled in the art recognize that color coding can be achieved by means other than the color coding box 40 such as, but not limited to, color coding the characters in the math expressions. Those skilled in the art also recognize that in some cases, the question description may not be color coded (e.g. if it only comprises a textual description and does not include algebraic notation). In these cases, the first step of the step by step solution will be highlighted with the first highlighting color rather than the question description.

Figure 4B:
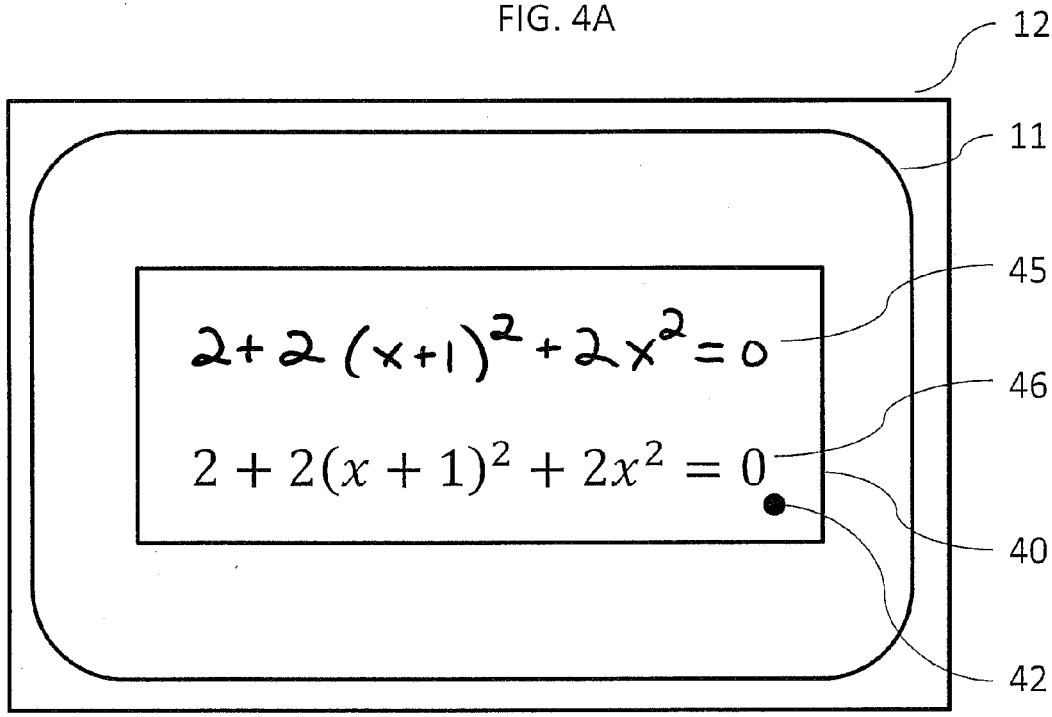
FIG. 4B is a simplified pictorial illustration of a second GUI display of a student's computer of the system of the present invention showing an equation comprising a first step of a step by step solution to a math problem which illustrates a first example problem used in the teaching phase of the method of the present invention.
Figure 5A:
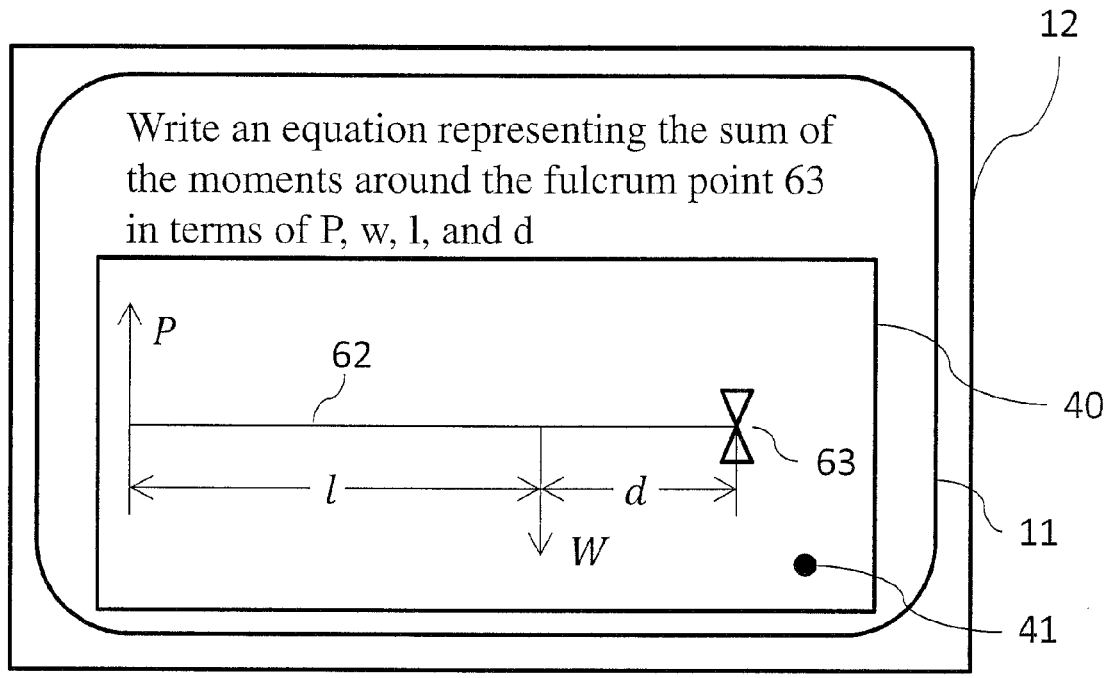
FIG. 5A is a simplified pictorial illustration of a first GUI display of a student's computer of the system of the present invention showing a lever and fulcrum diagram to illustrate a STEM problem comprising a second example problem used in the exercise phase of the method of the present invention.
Figure 5B:
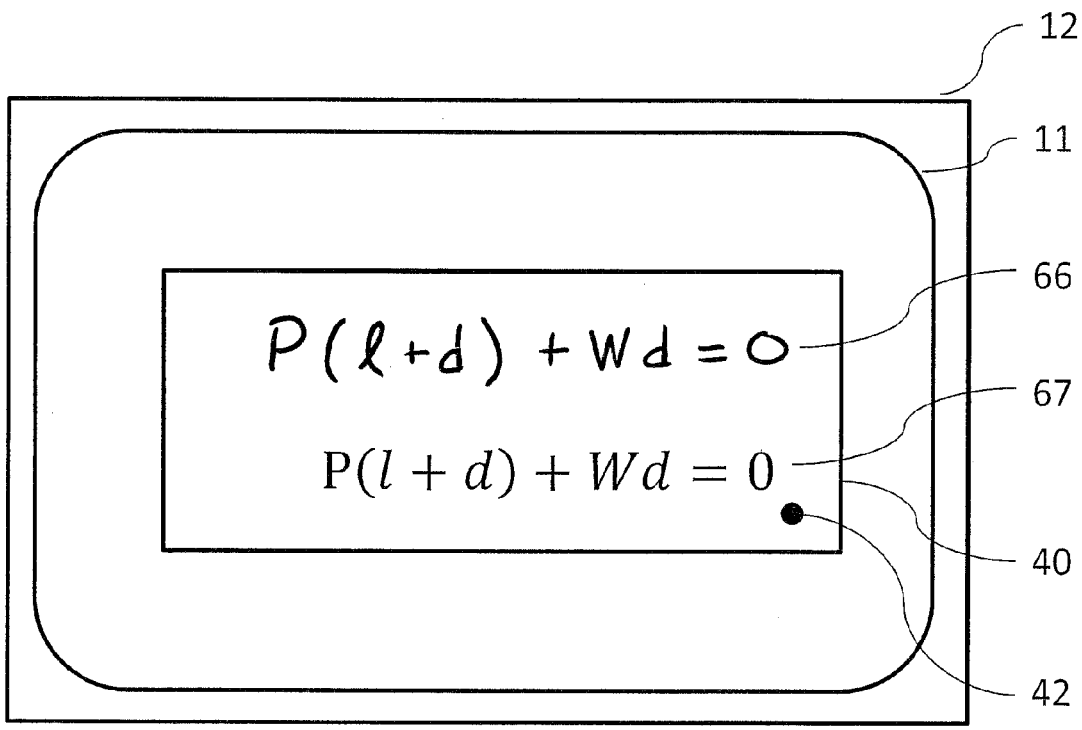
FIG. 5B is a simplified pictoral illustration of a second GUI of a student's computer of the system of the present invention showing an equation comprising the first step of a step by step solution to a second example problem used in the teaching phase of the present invention.
Figure 5C:
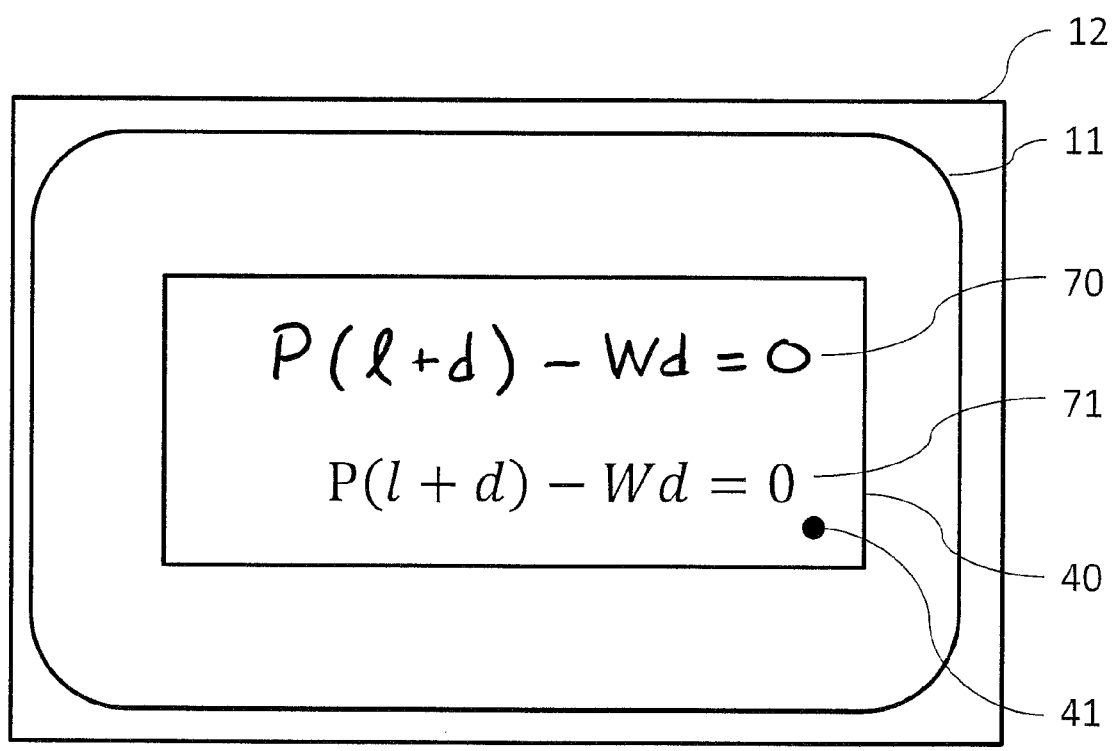
FIG. 5C is a simplified pictoral illustration of a third GUI of a student's computer of the system of the present invention showing an equation comprising the second step of a step by step solution to a second example problem used in the teaching phase of the present invention.

FIG. 4B is a simplified pictoral illustration of a second GUI display residing on the screen 11 of the student computer 12 when the system is being used to teach a step by step solution to the first example problem. The second GUI display is generated by the teacher having written on the teacher computer 10 an incorrect next step 45 in order to initiate a class discussion as to why this equation is not correct. The recognition engine 18 and the CAS 20 determined that the equation $2+2(x+1)^2+2x^2=0$ (reference No. 45) is neither an algebraic equivalent of the correct answer nor any previous step and have highlighted it in the highlighting box 40 with the second color, yellow 42. Also included in the highlighting box 40 is a typeface version 46 of the handwritten equation 45.

Figure 4C:
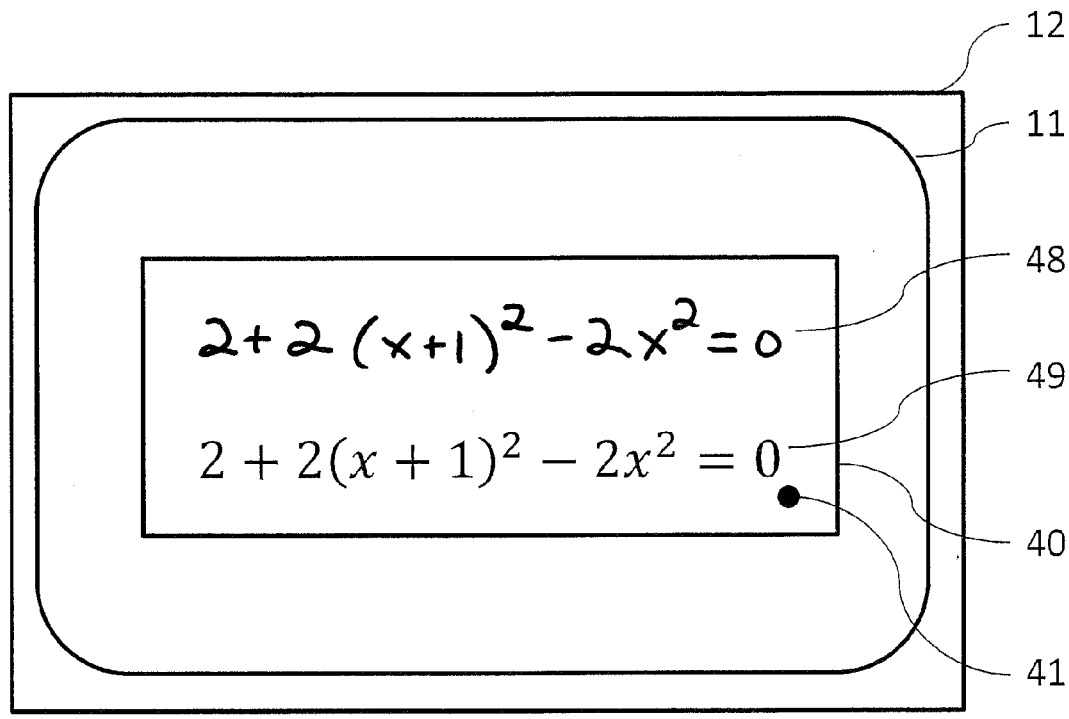
FIG. 4C is a simplified pictorial illustration of a third GUI display of a student's computer of the system of the present invention showing an equation comprising a second step of a step by step solution to a math problem which illustrates a first example problem used in the teaching phase of the method of the present invention.

FIG. 4C is a simplified pictoral illustration of a third GUI display residing on the screen 11 of the student computer 12 after the teacher has corrected the second GUI display (FIG. 4B) as a result of the class discussion. The handwritten equation 48 in FIG. 4C is now the algebraic equivalent of the equation 36 in FIG. 4A and is highlighted in green 41. Also included in the highlighting box 40 is a typeface version 49 of the handwritten equation 48.

Figure 4D:
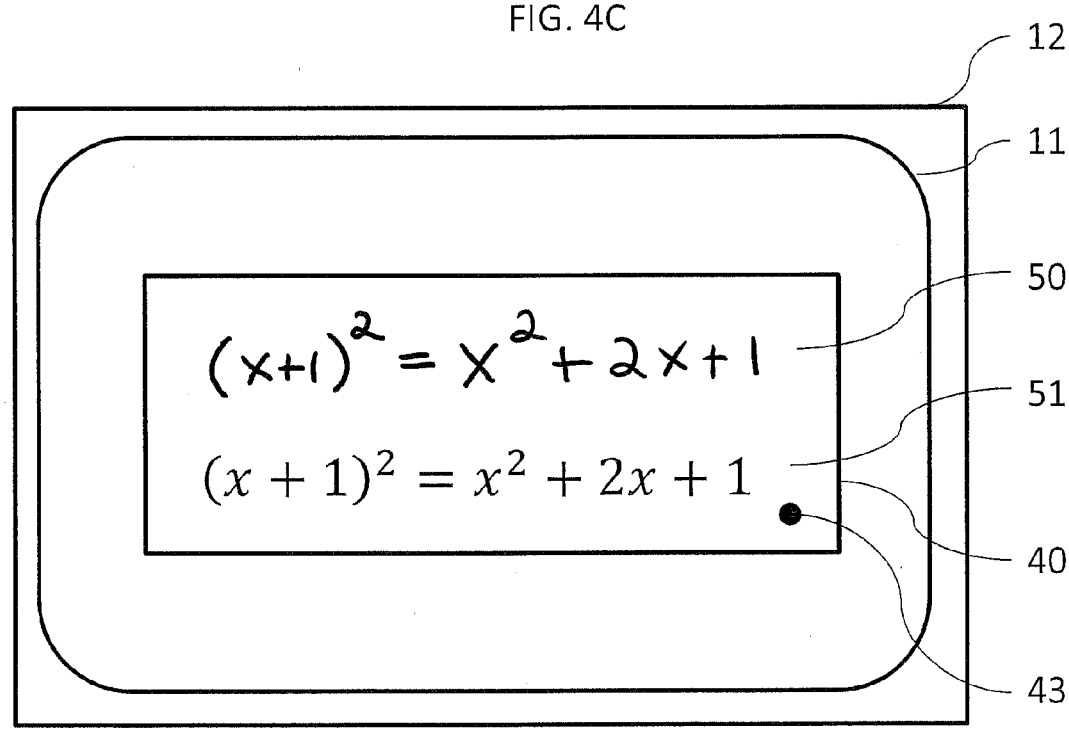
FIG. 4D is a simplified pictorial illustration of a fourth GUI display of a student's computer of the system of the present invention showing an equation comprising a third step of a step by step solution to a math problem which illustrates a first example problem used in the teaching phase of the method of the present invention.
Figure 4E:
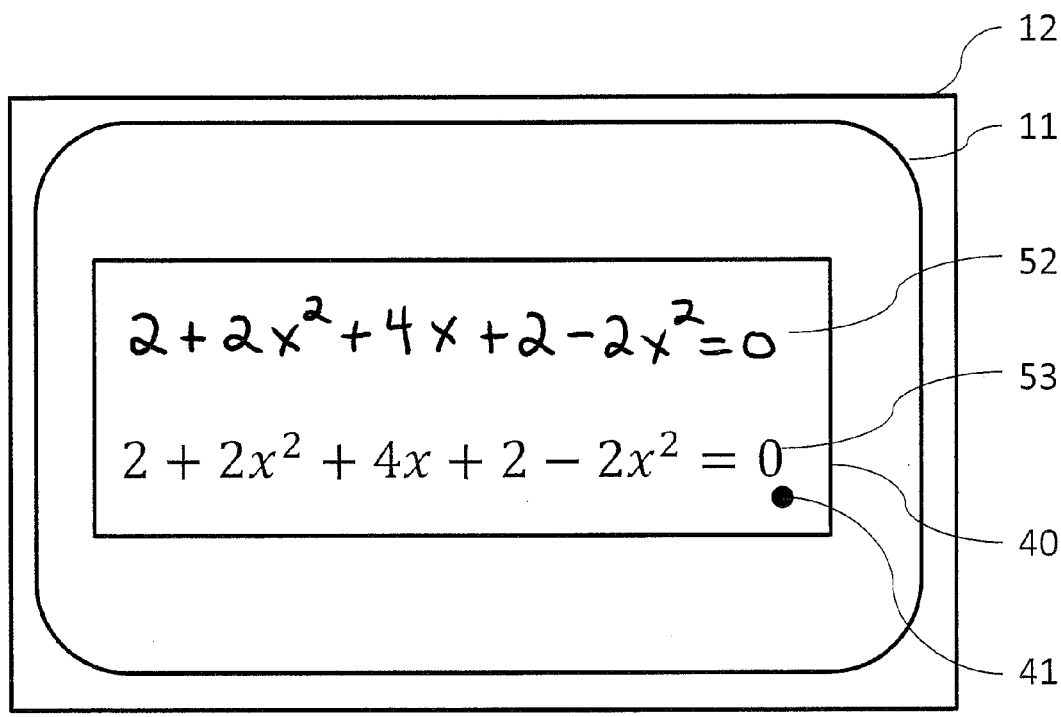
FIG. 4E is a simplified pictorial illustration of a fifth GUI display of a student's computer of the system of the present invention showing an equation comprising a fourth step of a step by step solution to a math problem which illustrates a first example problem used in the teaching phase of the method of the present invention.

FIG. 4D is a simplified pictoral illustration of a fourth GUI display residing on the screen 11 of the student computer depicting an intermediate step to illustrate an algebraic manipulation, $(x+1)^2=x^2+2x+1$ (reference No. 50), required to proceed from the step shown in FIG. 4C to the step shown in FIG. 4E. Since the step shown in FIG. 4D is an intermediate step and is not the algebraic equivalent of a preceding step, it is highlighted in the color blue 43. Also included in the highlighting box 40 is a type face version 51 of the handwritten equation 50.

FIG. 4E is a simplified pictoral illustration of a fifth GUI display residing on the screen 11 of the student computer 12 depicting a handwritten equation 52 which includes the expansion of $(x+1)^2$ shown in FIG. 4D. The handwritten equation 52 is the algebraic equivalent of the equation 49 shown in FIG. 4C and is therefore highlighted in green 41. Also included in the highlighting box 40 is a typeface version 53 of the handwritten equation 52.

Figure 4F:
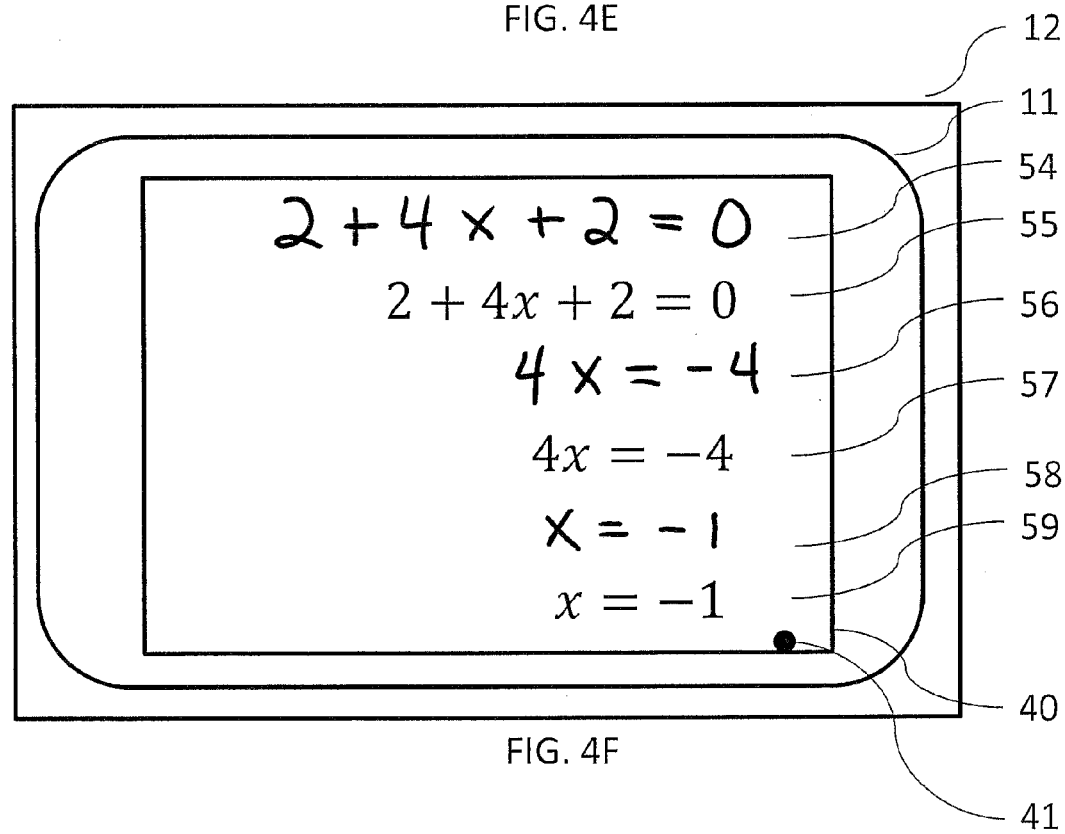
FIG. 4F is a simplified pictorial illustration of a sixth GUI display of a student's computer of the system of the present invention showing an equation comprising a fifth step of a step by step solution to a math problem which illustrates a first example problem used in the teaching phase of the method of the present invention.

FIG. 4F is a simplified pictorial illustration of a sixth GUI display residing on the screen 11 of the student computer 12 depicting the remaining steps of the step by step solution to the first example problem. Since all of the expressions in FIG. 4F are the algebraic equivalent of the expression in FIG. 4A, they are highlighted in green 41. The first equation 54 in FIG. 4F is a simplification of the equation 52 shown in FIG. 4E. The second equation 55 in FIG. 4F is a typeface version of the first equation 54. The third equation 56 is a simplification of the previous equation 54. The fourth equation 57 is a typeface version of the third equation 56. The fifth equation 58 is the final step in the step by step solution. The sixth equation 59 is a typeface version of the final step 58.

FIG. 4G summarizes the colors providing a completely color coded step by step solution to the first example problem described in FIG. 4A to FIG. 4F. Lines 1 through 6 in FIG. 4G list, in order, the sequence of the colors used in the color coding protocol of the first example. The colors being preselected by the teacher and the sequence being automatically generated in accordance with the protocol of the system of the present invention. No other teaching intervention of which we are aware enables the spontaneous automatic color coding of each step of a step by step solution ultimately resulting in a fully color coded answer that provides a graphic representation of a complete solution. Without employing the present invention, it would be difficult for a teacher to color code each step of a step by step solution as each step is presented in a lesson while maintaining a color coding protocol which enables graphic visualization of the complete solution.

As shown in FIG. 4G, green is preselected to color code a math expression having algebraic equivalence to either the correct answer or any previous step of algebraic equivalence. Yellow is preselected as a second color to color code an expression which is not an algebraic equivalent of a previous step. In the first step of the first example, an erroneous step is deliberately selected to engage the students and is automatically color coded yellow. Finally, blue is the third color preselected to signify an additional step which is not an algebraic equivalent of a previous step. In the first example, the step which is color coded blue is an intermediate step used to explain the algebraic expansion of an expression in order to proceed in the step by step solution. The color coding protocol of the instant invention helps students to easily identify algebraically equivalent correct steps, erroneous steps, and intermediate steps in a solution rather than trying to decipher complicated algebraic expressions to determine their rationale. As can be seen from the foregoing, the color coding protocol of the instant invention is open ended and the system can accommodate a lengthy step by step solution.

FIGS. 5A to 5C are simplified pictorial illustrations of the GUI displays residing on the student computer 12 showing a step by step solution to a second example problem used to illustrate the exercise phase of the present invention. In this example, the colors in the color coding protocol have been preselected by the user.

FIG. 5A shows a lever 62 and a fulcrum 63 illustrating a STEM problem used in the exercise phase of the present invention. In this example, a student solves the problem using a step by step solution guided by the color coding functionality of the present invention. In FIG. 5A, an upward force P is acting on the lever 62 balancing a downward force W. The lever 62 is rotatable about the fulcrum 63. The force P is a distance, l+d, from the fulcrum 63 and the force W is a distance, d, from the fulcrum 63. The student is using the student computer 12 wherein the application of the present invention has been installed. The student prompts the example problem, as shown in FIG. 5A, to appear on the screen 11 of the student computer 12. A correct answer, $P(l+d)=Wd$ is stored in the student's computer memory 32 but is not displayed on the screen 11 of the student computer 12.

The student enters the first step of a step by step solution, $p(l+d)+Wd=0$ (reference No. 66), via handwritten math notation on the screen 11 of the student computer 12. The recognition engine 18 in the student computer 12 creates a typeface version 67 of the expression to acknowledge having received and understood the math expression. In the second example, expressions which are entered by the student into the student computer 12 which are an algebraic equivalent of the hidden correct answer are color coded green 41 and expressions which are not the algebraic equivalent of the hidden correct answer are color coded yellow 42. By way of example, as shown in FIG. 5B, the student has entered an answer which is not an algebraic equivalent of the correct answers. The recognition engine 18 and the CAS 20 evaluated the answer as not being an equivalent and highlight it in yellow 42, thereby immediately notifying the student that the answer is incorrect. The student reviews his/her input and tries another answer. As shown in FIG. 5C, the student enters the correct answer, $P(l+d)-Wd=0$, reference No. 70. The recognition engine 18 and the CAS 20 evaluate the answer as being the algebraic equivalent of a correct answer, create typeface version 71 thereof and highlight it in green 41 indicating that it is an algebraic equivalent of a correct answer.

The two example problems described above disclose how the system and method of the present invention provide instant feedback as to the correctness of the next step of a step by step solution by automatically generating color coding to indicate whether handwritten answers are correct as they are being entered on the screen of a tablet PC by a teacher or a student. It is important to note that this color coding method is unique and provides feedback regarding handwritten input including a fully color coded step by step solution which provides students with a visual representation of the entire step by step process which is unlike any other problem solving method of which we are aware. Because problems are input via handwritten standard math notation, both students and teachers can enter problems and their solutions without having to learn a programming language.

Unlike the prior art, the system and method of the present invention enable teachers, in real time, to tailor their solutions to fill specific student needs and answer students' questions as solutions are being developed in classroom lessons. In the system and method of the present invention, all of the steps of a step by step solution are clearly linked by color coding and, if needed, the teacher can explain the linkages as the lesson progresses. Furthermore, the color coding makes it easy for the teacher to refer to linked steps when explaining a lengthy and complex step by step solution. Students gain a clearer understanding of the solution by seeing a logical progression of steps which are visually linked by color coding rather than a display screen with a myriad of solution steps without a visible linkage. Whatever examples the teacher selects, the pen-centric presentation process included in the present invention is easy to use and does not interrupt the teaching flow in the class.

It is also important to note that the instant invention provides a unique approach to fulfilling practices in the well known teaching guidelines for middle school and high school math in what are called Common Core State Standards for Science and Math (CCSSM). These standards recommend the use of real world example problems in the teaching of math and science and further recommend that students utilize "guess and check" methods to solve these problems. Students guess at an answer and then check it to see if it is correct.

When a student uses his or her student computer 12 in the exercise phase of the present invention to solve an example problem, the student creates the steps of the step by step solution and is not directed to pursue a particular approach by the intervention. The present invention does not relieve the student of the thought provoking exercise of determining the next step. As noted above, CCSSM guidelines teach that students learn to solve problems and gain a better understanding of math principles if they themselves develop the solution and test whether it is correct or not. The present invention aligns with CCSSM standards which encourage students to try different answers (guess and check) as a way to arrive at solutions to problems. The present invention saves the students time by instantly notifying them if their next step selection is correct.

Figure 6:
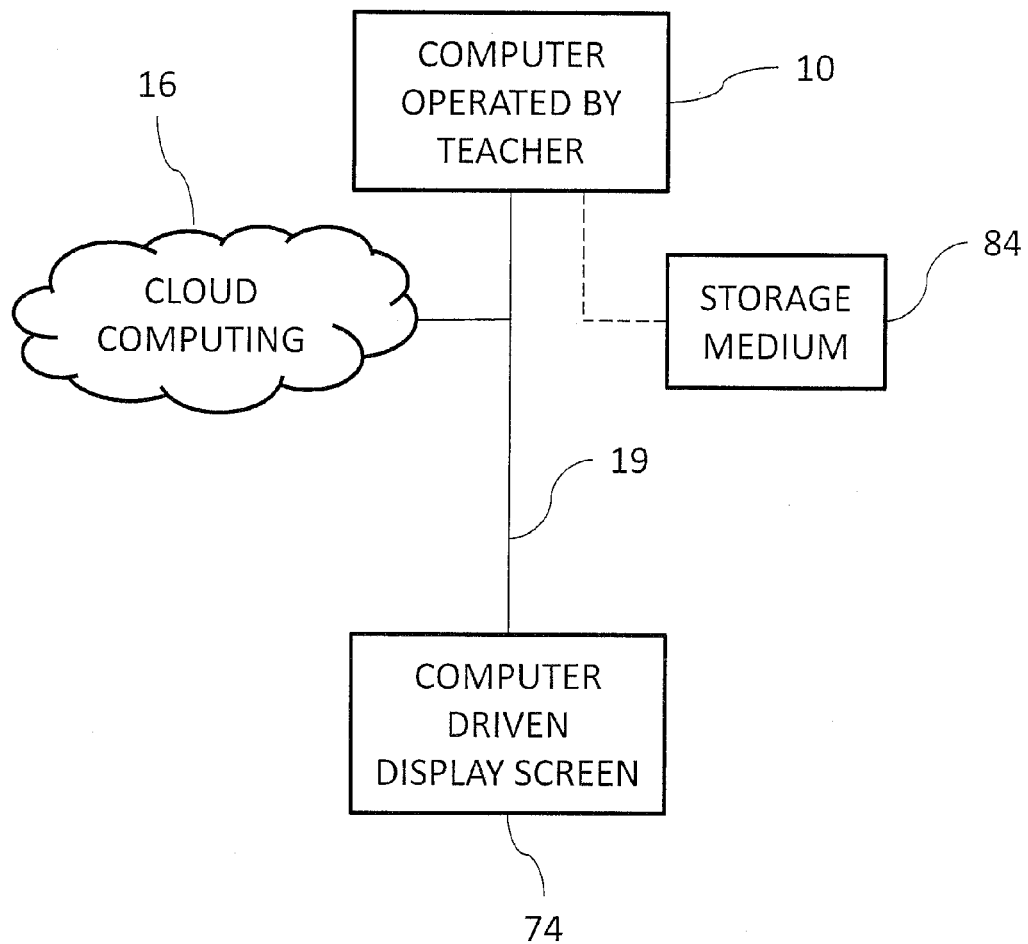
FIG. 6 is a block diagram illustrating a second embodiment of a computerized teaching system formed in accordance with the present invention having a teacher's computer linked to a display screen, cloud computing, and a computer readable storage medium.
Figure 7:
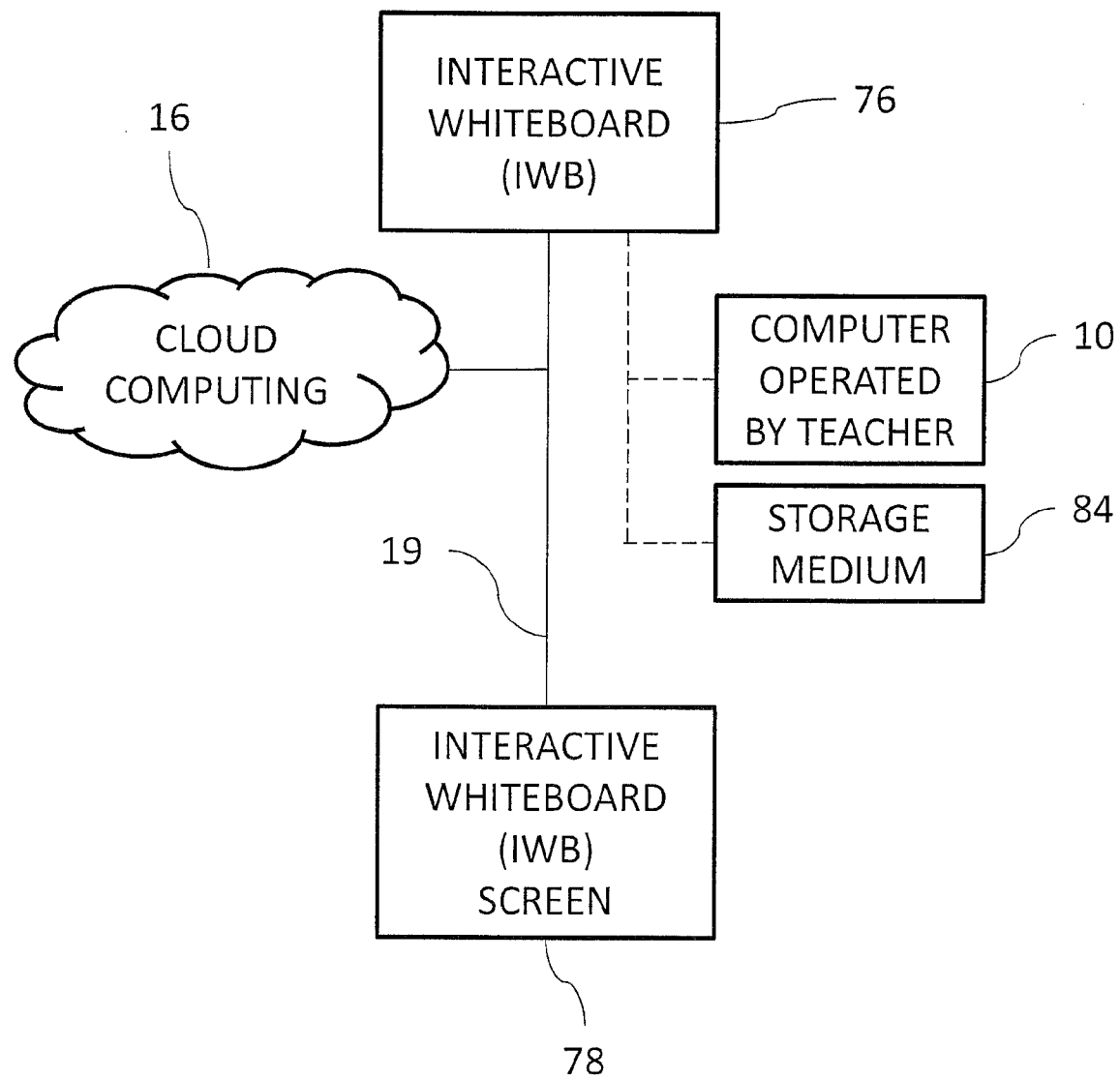
FIG. 7 is a block diagram illustrating a third embodiment of a computerized teaching system formed in accordance with the present invention having an IWB screen linked to an IWB computer, cloud computing and a computer-readable storage medium.
Figure 8:
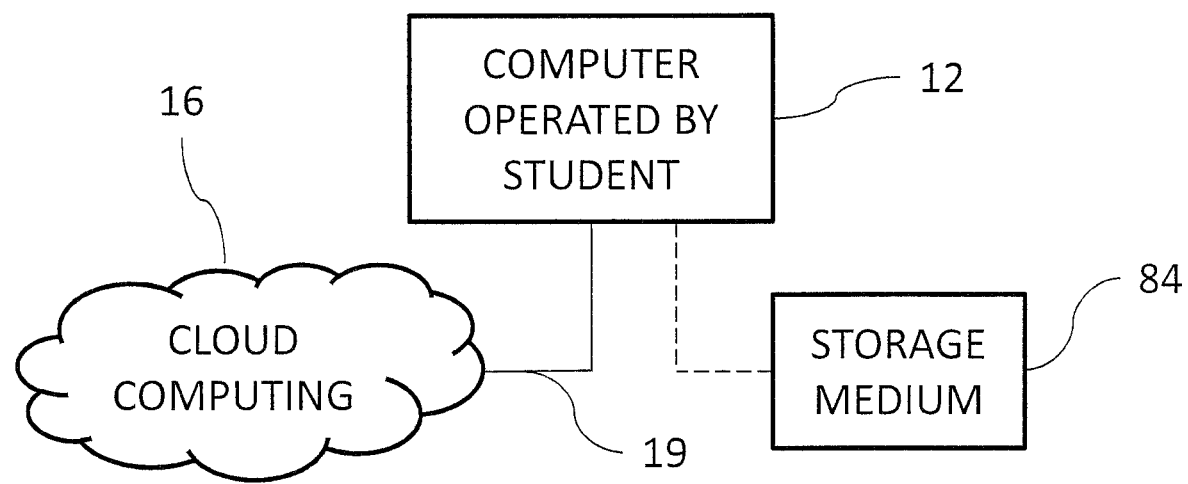
FIG. 8 is a block diagram illustrating a fourth embodiment of a computerized teaching system formed in accordance with the present invention having a computer operated by a student, the computer being linked to cloud computing, and a computer readable storage medium.

What follows are descriptions of FIGS. 6, 7, and 8 which are alternate embodiments of the present invention. The alternate embodiments can be deployed in the teaching phase and the exercises phase of the present invention using the example problems and methods of the present invention, as described above.

FIG. 6 is a block diagram of a second embodiment of a computerized teaching system formed in accordance with the present invention comprising the teacher computer 10, cloud computer 16, non-transitory storage medium 84, and a computer driven display screen 74. The elements of the second embodiment may be hard wired together or networked on a LAN, a WAN, or the WWW as described above. The second embodiment may be used in a classroom setting wherein the students may not have access to PCs and view the teacher's lessons which are input by the teacher and projected on a projection screen 74 located in front of the classroom. The screen displays images generated by a projector or computer operated by the teacher. In the second embodiment, the computer 10 is preferably the tablet computer 10 described in FIG. 2. The images are displayed in real time, as the teacher inputs the computer 10 with handwritten notation. The cloud computing 16 and the storage medium 84 provide the same functionality as described in the first embodiment and therefore, are not described again. The first example problem, as described above (FIG. 4A), exemplifies the system and method the teacher can use to teach step by step solutions using the second embodiment of the present invention. For the sake of brevity, its use and benefits are not repeated herein.

FIG. 7 is a block diagram of a third embodiment of a computerized teaching system formed in accordance with the present invention comprising an IWB having a touch sensitive screen 78, cloud computer 16, a teacher computer, 10 and a non-transitory storage medium 84. The elements of the third embodiment may be hard wired together or networked on a LAN, a WAN, or the WWW as described above. The third embodiment is described in a classroom setting wherein the students may not have access to PCs and view the teacher's lessons which are input by the teacher and displayed on the touch sensitive screen 78 of the IWB 76 located in front of the class. IWBs are commercially available from a number of manufacturers such as Smart Technologies located in Calgary, Canada or Promethean located in Alpharetta, Ga. The IWB displays images input via handwritten math notation and sketches made by the teacher on the touch sensitive screen 78 of the IWB and displayed on the screen 78 located in front of the class. The cloud computing 16 and the storage medium 84 provide the same functionality as described in the first embodiment and therefore are not described again.

FIG. 8 is a block diagram of a fourth embodiment of a computerized teaching system formed in accordance with the present invention comprising the student computer 12, cloud computing 16 and the non-transitory storage medium 84. The elements of the fourth embodiment may be hard wired together or networked on a LAN, a WAN, or the WWW as disclosed above. The fourth embodiment may be used in an education setting wherein the students have access to Tablet PCs such as the student computer 12 which, along with the cloud computer 16 and storage medium 84, have been disclosed above and therefore are not described again.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A computerized teaching system providing a teaching tool for presenting and teaching step by step solutions to STEM (science, technology, engineering and mathematics) questions, the system comprising:
   a communications network;
   at least one teacher computer operable by a respective teacher;
   at least one student computer operable by a respective student; and
   at least one computer-readable storage medium;
   wherein each of the at least one teacher computer and the at least one student computer includes an input device and a touch sensitive screen for receiving handwritten input via the input device;
   wherein the at least one student computer is operably connected to the at least one teacher computer via the communications network; and
   wherein the at least one teacher computer and the at least one student computer are operatively linked to the at least one computer-readable storage medium containing program instructions for implementing an application of the teaching system comprising one or more program instructions for performing the steps of:
   (a) receiving at least one question description being handwritten in algebraic math notation by the teacher on the touch sensitive screen of the at least one teacher computer and being displayed thereon;
   (b) highlighting the math notation of the at least one question description defined in step (a) using a first highlighting color to provide a highlighted math notation of the at least one question description;
   (c) displaying the highlighted math notation of the at least one question description of step (b) on the screen of the at least one student computer;
   (d) receiving at least one step of a step by step solution to the at least one question description, the at least one step being handwritten by the teacher in algebraic math notation on the screen of the at least one teacher computer and being displayed thereon;
   (e) highlighting the math notation of the at least one step in step (d) by either using the first highlighting color in step (b) if the math notation of the at least one step of step (d) is the algebraic equivalent of the math notation of the at least one question description of step (b) or using a second highlighting color if the math notation of the at least one step of step (d) is not the algebraic equivalent of the math notation of the at least one question description of step (b) to provide a highlighted math notation of the at least one step, the first highlighting color being different from the second highlighting color;

(f) displaying the highlighted math notation of the at least one step of step (e) in one of the first highlighting color and the second highlighting color on the screen of the at least one student computer; and (g) repeating steps (d), (e) and (f), if necessary, to provide and display on the screen of the at least one student computer a completely color coded step by step solution to the at least one question description.

2. The system according to claim 1, wherein the at least one computer-readable storage medium includes a highlighting color coding protocol stored therein, whereby each step of the step by step solution is automatically highlighted by at least one of the at least one teacher computer and the at least one student computer in accordance with the protocol to provide a color coded graphic visualization of all of the steps presented in creating the solution displayed on the at least one of the at least one teacher computer and the at least one student computer.

3. The system according to claim 2, wherein the color coding protocol highlights each step of the step by step solution with one of the first highlighting color and the second highlighting color.

4. The system according to claim 3, wherein the first highlighting color and the second highlighting color are preselected by the teacher and input into the at least one computer-readable storage medium for subsequent automatic highlighting of each step of the step by step solution in accordance with the color coding protocol as each step is received by the at least one teacher computer.

5. The system according to claim 3, wherein the first highlighting color and the second highlighting color are automatically selected by the at least one computer-readable storage medium in accordance with the color coding protocol as each step of the step by step solution is received by the at least one teacher computer.

6. The system according to claim 1, wherein each of the highlighted math notations is color coded by displaying each of the math notations within a box having a perimeter, the perimeter of the box being highlighted in one of the first highlighting color and the second highlighting color.

7. The system according to claim 1, wherein the touch sensitive screen of the at least one teacher computer and the touch sensitive screen of the at least one student computer are scrolled by a user to at least one of input and observe steps of the step by step solution.

8. The system according to claim 1, wherein a typeface version of each of the handwritten at least one question description and the handwritten at least one step is displayed on the screen of the at least one teacher computer.

9. The system according to claim 1, wherein the input device is a stylus.

10. The system according to claim 1, wherein the input device is a user's fingertip performing the function of a stylus.

11. The system according to claim 1, wherein the at least one question description includes at least one hand drawn sketch.

12. The system according to claim 1, wherein the at least one question description is received by the at least one teacher computer prior to displaying the solution on the screen of the at least one student computer.

13. The system according to claim 1, wherein the at least one question description is received by the at least one teacher computer during the displaying of the solution on the screen of the at least one student computer.

14. The system according to claim 1, wherein the communication network includes cloud computing to provide additional computing capacity for at least one of the at least one teacher computer and the at least one student computer.

15. The system according to claim 1, which further comprises a database of pre-defined question descriptions operatively linked to the communications network, and wherein the at least one question description is received by the at least one teacher computer from the database of pre-defined question descriptions.

16. The system according to claim 1, wherein the input device is one of a physical keyboard and a virtual soft keyboard residing on the screen of at least one of the at least one teacher computer and the at least one student computer.

17. A computerized teaching system providing a teaching tool for presenting and teaching step by step solutions to STEM (science, technology, engineering and mathematics) questions, the system comprising:
  a communications network;
  at least one teacher computer operable by a respective teacher;
  at least one student computer operable by a respective student; and
  at least one computer-readable storage medium;
  wherein each of the at least one teacher computer and the at least one student computer includes an input device and a touch sensitive screen for receiving handwritten input via the input device;
  wherein the at least one student computer is operably connected to the at least one teacher computer via the communications network; and
  wherein the at least one teacher computer and the at least one student computer are operatively linked to the at least one computer-readable storage medium containing program instructions for implementing an application of the teaching system comprising one or more program instructions for performing the steps of:
  (a) receiving at least one question description being handwritten in algebraic math notation by the teacher on the touch sensitive screen of the at least one teacher computer and being displayed thereon;
  (b) highlighting the math notation of the at least one question description defined in step (a) using a first highlighting color to provide a highlighted math notation of the at least one question description;
  (c) displaying the highlighted math notation of the at least one question description of step (b) on the screen of the at least one student computer;
  (d) receiving at least one step of a step by step solution to the at least one question description, the at least one step being handwritten by the teacher in algebraic math notation on the screen of the at least one teacher computer and being displayed thereon;
  (e) highlighting the math notation of the at least one step in step (d) by either using the first highlighting color in step (b) if the math notation of the at least one step of step (d) is the algebraic equivalent of the math notation of the at least one question description of step (b), using a second highlighting color if the math notation of the at least one step of step (d) is an incorrect algebraic expression of the math notation of the at least one question description of step (b) to provide a highlighted math notation of the at least one step, or using a third highlighting color if the math notation of the at least one step of step (d) is an intermediate step illustrating an algebraic manipulation to provide a highlighted math notation of the at least one step, the first highlighting color being different from the second highlighting color, and the second highlighting color being different from the third highlighting color;

(f) displaying the highlighted math notation of the at least one step of step (e) in one of the first highlighting color, the second highlighting color and the third highlighting color on the screen of the at least one student computer; and (g) repeating steps (d), (e) and (f), if necessary, to provide and display on the screen of the at least one student computer a completely color coded step by step solution to the at least one question description.

18. A computerized teaching system providing a teaching tool for presenting and teaching step by step solutions to STEM (science, technology, engineering and mathematics) questions, the system comprising:

a communications network;

at least one teacher computer operable by a respective teacher;

at least one computer driven display screen; and at least one computer-readable storage medium;

wherein the at least one teacher computer includes an input device and a touch sensitive screen for receiving handwritten input via the input device;

wherein the at least one computer driven display screen is operably connected to the at least one teacher computer via the communications network; and wherein the at least one teacher computer is operatively linked to the at least one computer-readable storage medium containing program instructions for implementing an application of the teaching system comprising one or more program instructions for performing the steps of:

(a) receiving at least one question description being handwritten in algebraic math notation by the teacher on the touch sensitive screen of the at least one teacher computer and being displayed thereon;

(b) highlighting the math notation of the at least one question description defined in step (a) using a first highlighting color to provide a highlighted math notation of the at least one question description;

(c) displaying the highlighted math notation of the at least one question description of step (b) on the at least one computer driven display screen;

(d) receiving at least one step of a step by step solution to the at least one question description, the at least one step being handwritten by the teacher in algebraic math notation on the screen of the at least one teacher computer and being displayed thereon;

(e) highlighting the math notation of the at least one step in step (d) by either using the first highlighting color in step (b) if the math notation of the at least one step of step (d) is the algebraic equivalent of the math notation of the at least one question description of step (b) or using a second highlighting color if the math notation of the at least one step of step (d) is not the algebraic equivalent of the math notation of the at least one question description of step (b) to provide a highlighted math notation of the at least one step, the first highlighting color being different from the second highlighting color;

(f) displaying the highlighted math notation of the at least one step of step (e) in one of the first highlighting color and the second highlighting color on the at least one computer driven display screen; and (g) repeating steps (d), (e) and (f), if necessary, to provide and display on the at least one computer driven display screen a completely color coded step by step solution to the at least one question description.

19. A computerized teaching system providing a teaching tool for presenting and teaching step by step solutions to STEM (science, technology, engineering and mathematics) questions, the system comprising:

a communications network;

at least one teacher computer operable by a respective teacher; and at least one interactive whiteboard; and at least one computer-readable storage medium;

wherein the at least one teacher computer includes an input device and a touch sensitive screen for receiving handwritten input via the input device;

wherein the at least one interactive whiteboard is operably connected to the at least one teacher computer via the communications network; and wherein the at least one teacher computer is operatively linked to the at least one computer-readable storage medium containing program instructions for implementing an application of the teaching system comprising one or more program instructions for performing the steps of:

(a) receiving at least one question description being handwritten in algebraic math notation by the teacher on the touch sensitive screen of the at least one teacher computer and being displayed thereon;

(b) highlighting the math notation of the at least one question description defined in step (a) using a first highlighting color to provide a highlighted math notation of the at least one question description;

(c) displaying the highlighted math notation of the at least one question description of step (b) on the at least one interactive whiteboard;

(d) receiving at least one step of a step by step solution to the at least one question description, the at least one step being handwritten by the teacher in algebraic math notation on the screen of the at least one teacher computer and being displayed thereon;

(e) highlighting the math notation of the at least one step in step (d) by either using the first highlighting color in step (b) if the math notation of the at least one step of step (d) is the algebraic equivalent of the math notation of the at least one question description of step (b) or using a second highlighting color if the math notation of the at least one step of step (d) is not the algebraic equivalent of the math notation of the at least one question description of step (b) to provide a highlighted math notation of the at least one step, the first highlighting color being different from the second highlighting color;

(f) displaying the highlighted math notation of the at least one step of step (e) in one of the first highlighting color and the second highlighting color on the at least one interactive whiteboard; and (g) repeating steps (d), (e) and (f), if necessary, to provide and display on the at least one interactive whiteboard a completely color coded step by step solution to the at least one question description.

20. A computerized teaching system providing a teaching tool for presenting and teaching step by step solutions to STEM (science, technology, engineering and mathematics) questions, the system comprising:
  at least one student computer operable by a respective student; and
  at least one computer-readable storage medium;
  wherein the at least one student computer includes an input device and a touch sensitive screen for receiving handwritten input via the input device;
  wherein the at least one student computer is operatively linked to the at least one computer-readable storage medium containing program instructions for implementing an application of the teaching system comprising one or more program instructions for performing the steps of:
  (a) receiving at least one question description defined by algebraic math notation on the at least one student computer;
  (b) highlighting the math notation of the at least one question description defined in step (a) using a first highlighting color to provide a highlighted math notation of the at least one question description;
  (c) displaying the highlighted math notation of the at least one question description of step (b) on the screen of the at least one student computer;
  (d) receiving at least one step of a step by step solution to the at least one question description, the at least one step being handwritten by the student in algebraic math notation on the screen of the at least one student computer;
  (e) highlighting the math notation of the at least one step in step (d) by either using the first highlighting color in step (b) if the math notation of the at least one step of step (d) is the algebraic equivalent of the math notation of the at least one question description of step (b) or using a second highlighting color if the math notation of the at least one step of step (d) is not the algebraic equivalent of the math notation of the at least one question description of step (b) to provide a highlighted math notation of the at least one step, the first highlighting color being different from the second highlighting color;
  (f) displaying the highlighted math notation of the at least one step of step (e) in one of the first highlighting color and the second highlighting color on the screen of the at least one student computer; and
  (g) repeating steps (d), (e) and (f), if necessary, to provide and display on the screen of the at least one student computer a completely color coded step by step solution to the at least one question description.

* * * * *